(12) United States Patent
Jing et al.

(10) Patent No.: US 11,876,544 B2
(45) Date of Patent: Jan. 16, 2024

(54) TWO-GROUP PORTABLE SAME-FREQUENCY OR DIFFERENT-FREQUENCY CONTROL RADIO FREQUENCY CIRCUIT

(71) Applicant: Nanjing Congjing Biotechnology Co., LTD, Nanjing (CN)

(72) Inventors: Zhiqiang Jing, Nanjing (CN); Luping Ge, Nanjing (CN)

(73) Assignee: NANJING CONGJING BIOTECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 18/358,188

(22) Filed: Jul. 25, 2023

(65) Prior Publication Data

US 2023/0370100 A1 Nov. 16, 2023

(30) Foreign Application Priority Data

Jul. 27, 2022 (CN) .......................... 202210888475.3

(51) Int. Cl.
*H04B 1/04* (2006.01)
*H04B 1/40* (2015.01)

(52) U.S. Cl.
CPC ......... *H04B 1/0483* (2013.01); *H04B 1/0458* (2013.01)

(58) Field of Classification Search
None
See application file for complete search history.

(56) References Cited

U.S. PATENT DOCUMENTS

| 7,864,885 B2 * | 1/2011 | Cleveland | H04B 1/40 375/232 |
| 10,284,166 B2 * | 5/2019 | Sira | H03F 3/245 |
| 10,491,250 B2 * | 11/2019 | Horita | H03H 7/38 |

FOREIGN PATENT DOCUMENTS

| CN | 201167311 Y | 12/2008 | |
| CN | 112532237 A | 3/2021 | |
| EP | 4228137 A1 * | 8/2023 | ............ H02M 3/158 |

OTHER PUBLICATIONS

CNIPA, Notification of First Office Action for Chinese application CN202210888475.3, dated Sep. 23, 2022.
(Continued)

*Primary Examiner* — Pablo N Tran
(74) *Attorney, Agent, or Firm* — Zhigang Ma

(57) ABSTRACT

The present disclosure discloses a two-group portable same-frequency or different-frequency control radio frequency circuit, including two groups of radio frequency circuits and a circuit for controlling the two groups of radio frequency circuits; each group of radio frequency circuit includes a power filter circuit, a quartz crystal oscillator, a harmonic suppression circuit, an input end bias circuit, an input matching inductor, an amplifier, an output end bias circuit, an output matching circuit, a detection circuit, an antenna matching circuit, and an antenna. According to the disclosure, a controller and the detection circuits are used to perform time-sharing work on two groups of signals, and the two groups of signals are continuously switched to work, so that the problem of local heat accumulation is not caused, an action area is enlarged, and a load on key components is reduced, thereby improving the effect, the application range, and the reliability.

3 Claims, 8 Drawing Sheets

(56) References Cited

OTHER PUBLICATIONS

CNIPA, Notification of Second Office Action for Chinese application CN202210888475.3, dated Oct. 13, 2022.
CNIPA, Notification to grant patent right for Chinese application CN202210888475.3, dated Oct. 26, 2022.

* cited by examiner

TWO-GROUP PORTABLE SAME-FREQUENCY OR DIFFERENT-FREQUENCY CONTROL RADIO FREQUENCY CIRCUIT

TECHNICAL FIELD

The present disclosure relates to the technical field of radio frequency circuits, in particular to, a two-group portable same-frequency or different-frequency control radio frequency circuit.

BACKGROUND

Radio frequency (RF) refers to radio frequency current, which is a high-frequency alternating current varying electromagnetic wave. An alternating current that changes less than 1000 times per second is referred to as low-frequency current, and an alternating current that changes more than 1000 times is referred to as a high-frequency current. The radio frequency is the high-frequency current. The radio frequency current is converted into heat energy under the influence of resistance. Due to this principle, the radio frequency current is often applied in a radio frequency cosmetic instrument. For a single-frequency radio frequency generated by an existing radio frequency circuit, during use, due to long-term use of a single frequency, an action area is too concentrated, which can cause the problem of heat accumulation. If the single-frequency radio frequency is used for multiple times, the reliability of key components is reduced.

SUMMARY

The present disclosure aims to provide a two-group portable same-frequency or different-frequency control radio frequency circuit. A controller is used to perform time-sharing work on two groups of signals. The signals are emitted by antennas to act on two parts, and the two groups of signals are continuously switched to work, so that the problem of local heat accumulation is not caused, an action area is enlarged, and a load on key components is reduced, thereby improving the use effect, the application range, and the reliability.

In order to solve the above technical problem, the present disclosure provides the following technical solution: A two-group portable same-frequency or different-frequency control radio frequency circuit includes two groups of radio frequency circuits and a control circuit for controlling the two groups of radio frequency circuits; each group of radio frequency circuit includes a power filter circuit, a quartz crystal oscillator, a harmonic suppression circuit, an input end bias circuit, an input matching inductor, an amplifier, an output end bias circuit, an output matching circuit, a detection circuit, an antenna matching circuit, and an antenna.

The power filter circuit provides power for the quartz crystal oscillator; R is a current limiting resistor. Three capacitors filter out ripples with different frequencies in power, and small-ripple and stable power is provided for the quartz crystal oscillator.

The quartz crystal oscillator has good frequency stability and more accurate frequency accuracy compared to an LC crystal oscillator and a ceramic crystal oscillator.

The harmonic suppression circuit performs harmonics suppression on a signal generated by the quartz crystal oscillator, is composed of three capacitors and two inductors, filters out harmonic components and other clutter components, so as to provide a stable and accurate signal for an amplifier.

The input end bias circuit is a highly resistive component at an input end, which prevents the signal generated by the quartz crystal oscillator from flowing into the input end bias circuit. The capacitors are used for filtering power to prevent extremely high VGG power to cause damage.

The input matching inductor completes impedance transformation by one inductor, which plays a role in matching impedance of an input end of the amplifier with a source impedance.

The amplifier has a function of amplifying the signal.

The output end bias circuit is a highly resistive component with an inductor serving as an output end, which prevents the signal from flowing into the output end bias circuit, and four capacitors are used for power filtering.

The output matching circuit achieves an effect of matching an impedance of an output end of the amplifier with a load impedance by one inductor and one capacitor.

The detection circuit includes incidence detection and reflection detection which are respectively composed of one detection component, two resistors, and two capacitors.

The antenna matching circuit is composed of two inductors and one capacitor, completes impedance matching with the antenna, and can transmit the signal more efficiently.

The two groups of radio frequency circuits are switched by the control circuit and start working in turn in a time-sharing manner, and frequencies of the two groups of radio frequency circuits are set as the same frequencies or different frequencies for outputting.

As a preferred solution of the present disclosure, the same frequencies include 40.68 MHz, 27.12 MHz, and 13.56 MHz, which is a combination between the same frequencies of 40.68 MHz, 27.12 MHz, and 13.56 MHz in the two groups of radio frequency circuits.

The different frequencies include 40.68 MHz, 27.12 MHz, and 13.56 MHz, which are combinations of the different frequencies of 40.68 MHz, 27.12 MHz, and 13.56 MHz in the two groups of radio frequency circuits.

As a preferred solution of the present disclosure, the power filter circuit includes a current limiting resistor R8, a sixteenth capacitor C16, a seventeenth capacitor C17, and an eighteenth capacitor C18; an output end of the current limiting resistor R8 is connected to a power input end VCC of the quartz crystal oscillator; one end of the sixteenth capacitor C16, one end of the seventeenth capacitor C17, and one end of the eighteenth capacitor C18 are electrically connected to the output end of the current limiting resistor R8; the other end of the sixteenth capacitor C16, the other end of the seventeenth capacitor C17, and the other end of the eighteenth capacitor C18 are all grounded; and the sixteenth capacitor C16, the seventeenth capacitor C17, and the eighteenth capacitor C18 filter out ripples with different frequencies in power and provide small-ripple and stable power for the quartz crystal oscillator.

As a preferred solution of the present disclosure, the harmonic suppression circuit includes an eleventh capacitor C11, a twelfth capacitor C12, a nineteenth capacitor C19, a second inductor L2, and a third inductor L3; the eleventh capacitor C11, the second inductor L2, the third inductor L3, and the twelfth capacitor C12 are connected in series; one end of the nineteenth capacitor C19 is electrically connected to an output end of the second inductor L2, and the other end of the nineteenth capacitor C19 is grounded; and an input end of the eleventh capacitor C11 is connected to the output end of the quartz crystal oscillator, and an output end of the twelfth capacitor C12 is connected to an input end of the input matching inductor L5.

As a preferred solution of the present disclosure, the input end bias circuit includes a first resistor R1, a third resistor R3, a seventh resistor R7, a sixth capacitor C6, and an eighth capacitor C8; an output end of the first resistor R1 is electrically connected to the seventh resistor R7; one end of the third resistor R3, one end of the sixth capacitor C6, and one end of the eighth capacitor C8 are electrically connected to an output end of the first resistor R1; the other end of the third resistor R3, the other end of the sixth capacitor C6, and the other end of the eighth capacitor C8 are all grounded; and an output end of the seventh resistor R7 is connected to the input end of the input matching inductor L5.

As a preferred solution of the present disclosure, the output end bias circuit includes a first capacitor C1, a fourth capacitor C4, a fifth capacitor C5, a seventh capacitor C7, and a first inductor L1; one end of the first capacitor C1, one end of the fourth capacitor C4, one end of the fifth capacitor C5, and one end of the seventh capacitor C7 are connected to the first inductor L1, and the other end of the first capacitor C1, the other end of the fourth capacitor C4, the other end of the fifth capacitor C5, and the other end of the seventh capacitor C7 are grounded; and an output end of the first inductor L1 is connected to the output matching circuit.

As a preferred solution of the present disclosure, the output matching circuit includes a fourth inductor L4 and a fourteenth capacitor C14; one end of the fourteenth capacitor C14 is connected to the output end of the amplifier; and the other end of the fourteenth capacitor C14 is connected to the fourth inductor L4.

As a preferred solution of the present disclosure, the detection circuit includes a first detection diode J1, a second resistor R2, a second capacitor C2, a fourth resistor R4, a third capacitor C3, a second detection diode J2, a fifth resistor R5, a ninth capacitor C9, a sixth resistor R6, and a tenth capacitor C10; the first detection diode J1 and the fourth resistor R4 are connected in series in the circuit; one end of the second resistor R2 and one end of the second capacitor C2 are connected to an intersection point of the first detection diode J1 and the fourth resistor R4; the other end of the second resistor R2 and the other end of the second capacitor C2 are grounded; and one end of the third capacitor C3 is connected to the fourth resistor R4, and the other end of the third capacitor C3 is grounded.

The second detector diode J2 and the resistor R6 are connected in series in the circuit; one end of the resistor R5 and one end of the capacitor C9 are connected to an intersection point of the detection diode J2 and the sixth resistor R6; the other end of the fifth resistor R5 and the other end of the ninth capacitor C9 are grounded; and one end of the tenth capacitor C10 is connected to the sixth resistor R6, and the other end of the tenth capacitor C10 is grounded.

As a preferred solution of the present disclosure, the antenna matching circuit includes a sixth inductor L6, a seventh inductor L7, and a fifteenth capacitor C15; the sixth inductor L6 is connected in series with the seventh inductor L7; and one end of the fifteenth capacitor C15 is connected to the seventh inductor L7, and the other end of the fifteenth capacitor C15 is grounded.

As a preferred solution of the present disclosure, the antenna includes four copper rings; every two copper rings form a group of antenna emitters; and the corresponding antenna emitters are connected to the corresponding radio frequency circuits.

The present disclosure has the beneficial effects as follows: A controller and the detection circuits are used to perform time-sharing work on two groups of signals. The signals are emitted by the antennas to act on two parts, and the two groups of signals are continuously switched to work, so that the problem of local heat accumulation is not caused, an action area is enlarged, and a load on key components is reduced, thereby improving the use effect, the application range, and the reliability.

BRIEF DESCRIPTION OF THE DRAWINGS

In order to more clearly describe the technical scheme of the embodiments of the present disclosure, a brief introduction will be given to the accompanying drawings required in the description of the embodiments. It is apparent that the accompanying drawings in the following description are only some embodiments of the present disclosure. Those of ordinary skill in the art can also obtain other drawings according to these drawings without creative work. In the drawings.

Figure 1:
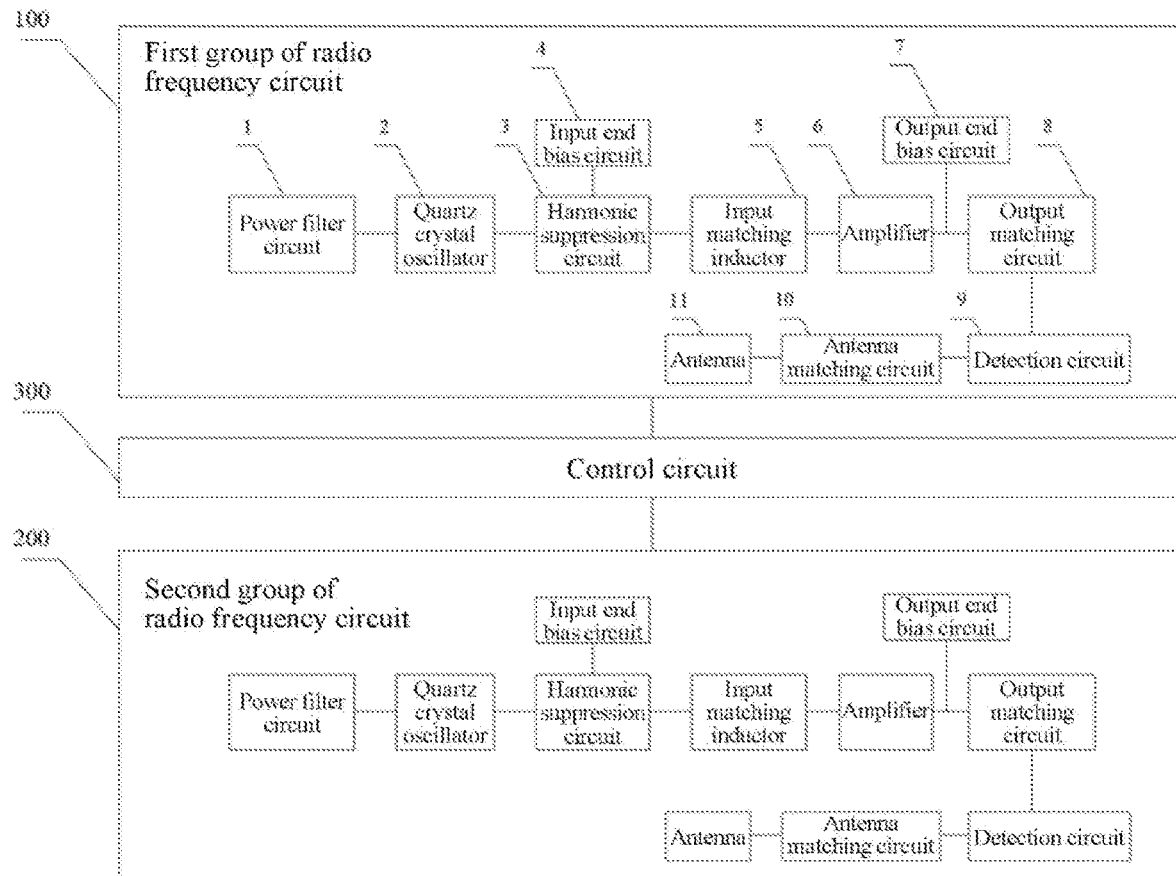
FIG. 1 is a schematic modularization diagram of two groups of radio frequency circuits in an embodiment of the present disclosure.

Numerals in the drawings: 1: power filter circuit; 2: quartz crystal oscillator; 3: harmonic suppression circuit; 4: input end bias circuit; 5: input matching inductor; 6: amplifier; 7: output end bias circuit; 8: output matching circuit; 9: detection circuit; 10: antenna matching circuit; 11: antenna;

100: first group of radio frequency circuit; 200: second group of radio frequency circuit; and 300: control circuit.

DETAILED DESCRIPTION OF THE EMBODIMENTS

In order to make the objectives, technical solutions and advantages of the embodiments of the present disclosure clearer, the technical solutions in the embodiments of the present disclosure are described clearly and completely below in conjunction with the drawings in the embodiments of the present disclosure. Obviously, the described embodiments are a part of the embodiments of the present disclosure, not all the embodiments. Based on the embodiments in the present disclosure, all other embodiments of those of ordinary skill in the art shall fall within the scope of protection of the present disclosure.

For a single frequency generated by an existing radio frequency circuit, during use, due to long-term use of the single frequency, an action area is too concentrated, which can cause the problem of heat accumulation. If the single-frequency radio frequency is used for multiple times, the reliability of key components is reduced.

Based on this, the present disclosure provides a two-group portable same-frequency or different-frequency control radio frequency circuit. Specific solutions are as follows:

Referring to FIG. 1, an embodiment of the present disclosure provides a two-group portable same-frequency or different-frequency control radio frequency circuit, including two groups of radio frequency circuits and a control circuit 300 for controlling the two groups of radio frequency circuits. The two groups of radio frequency circuits include a first group of radio frequency circuit 100 and a second group of radio frequency circuit 200; Each group of radio frequency circuit includes a power filter circuit 1, a quartz crystal oscillator 2, a harmonic suppression circuit 3, an input end bias circuit 4, an input matching inductor 5, an amplifier 6, an output end bias circuit 7, an output matching circuit 8, a detection circuit 9, an antenna matching circuit 10, and an antenna 11. The power filter circuit 1 is electrically connected to the quartz crystal oscillator 2, and the power filter circuit 1 is used for providing stable power for the quartz crystal oscillator 2. The quartz crystal oscillator 2 is electrically connected to the harmonic suppression circuit 3, and the quartz crystal oscillator 2 is used for generating a stable frequency for the circuit. The harmonic suppression circuit 3 is electrically connected to the input matching inductor 5, and the harmonic suppression circuit 3 is used for filtering out unnecessary frequency components for the circuit. The input end bias circuit 4 is electrically connected to the harmonic suppression circuit 3, and the input end bias circuit 4 is used for providing a bias voltage for the amplifier 6 and playing a role in starting and regulating a power output. The input matching inductor 5 is electrically connected to the amplifier 6 to complete input impedance matching of the amplifier 6. The amplifier 6 is electrically connected to the output matching circuit 8. The amplifier 6 is used for amplifying a signal generated by the quartz crystal oscillator 2 to meet needs of the circuit. The output end bias circuit 7 is connected in parallel between the amplifier 6 and the output matching circuit 8 and is used for providing a suitable power supplying voltage for the amplifier 6, ensuring stable and reliable operations of the circuit. The output matching circuit 8 is electrically connected to the detection circuit 9, and the output matching circuit 8 is used for completing output impedance matching of the amplifier 6. The detection circuit 9 is electrically connected to the antenna matching circuit 10. The detection circuit 9 is used for performing incidence and reflection detection on the signal, and the signal is collected in the form of a direct current voltage output. The antenna matching circuit 10 is connected in series with the antenna 11 to complete impedance matching. The antenna 11 outputs the power generated by the amplifier 6. The two groups of radio frequency circuits are switched by the control circuit 300 and then start to work in turn in a time-sharing manner, and frequencies of the two groups of radio frequency circuits are set as same frequencies or different frequencies for outputting.

According to the above, the power filter circuit 1 provides the stable power for the quartz crystal oscillator 2. The power filter circuit 1 is electrically connected in series to the quartz crystal oscillator 2. The quartz crystal oscillator 2 generates the stable frequency for the circuit. The quartz crystal oscillator 2 is electrically connected in series to the harmonic suppression circuit 3. The harmonic suppression circuit 3 filters out the unnecessary frequency components for the circuit. The harmonic suppression circuit 3 is electrically connected in series to the input matching inductor 5. The input end bias circuit 4 provides the bias voltage for the amplifier 6 and plays a role in starting and regulating a power output. The input end bias circuit 4 is electrically connected in parallel between the harmonic suppression circuit 3 and the input matching inductor 5. The input matching inductor 5 completes input impedance matching of the amplifier 6. The input matching inductor 5 is electrically connected in series to the amplifier 6. The amplifier 6 amplifies the signal generated by the quartz crystal oscillator 2 to meet needs of the circuit. The amplifier 6 is electrically connected in series to the output matching circuit 8. The output end bias circuit 7 provides the suitable power supplying voltage for the amplifier 6, ensuring stable and reliable operations of the circuit. The output end bias circuit 7 is connected in parallel between the amplifier 6 and the output matching circuit 8. The output matching circuit 8 completes output impedance matching of the amplifier 6. The output matching circuit 8 is electrically connected in series to the detection circuit 9. The detection circuit 9 performs incidence and reflection detection on the signal, and the signal is collected in the form of a direct current voltage output. The detection circuit 9 is electrically connected in series to the antenna matching circuit 10. The antenna matching circuit 10 completes impedance matching with an emitter to achieve an output with highest power. The antenna matching circuit 10 is connected in series with the antenna 11. The antenna 11 emits the signal power generated by the amplifier 6. The first group of radio frequency circuit 100 and the second group of radio frequency circuit 200 are switched by the control circuit 300 and then work in turn, so that the following problem can be solved: For a single-frequency radio frequency generated by an existing radio frequency circuit, during use, due to long-term use of the single frequency, an action area is too concentrated, which can cause heat accumulation. Frequencies of the two groups of radio frequency circuits are set as same frequencies or different frequencies for outputting.

Further, in this embodiment, the same frequencies include 40.68 MHz, 27.12 MHz, and 13.56 MHz, which is a combination between the same frequencies of 40.68 MHz, 27.12 MHz, and 13.56 MHz in the two groups of radio frequency circuits. The different frequencies include 40.68 MHz, 27.12 MHz, and 13.56 MHz, which are combinations of the different frequencies of 40.68 MHz, 27.12 MHz, and 13.56 MHz in the two groups of radio frequency circuits. In a further explanation, the radio frequency circuit is composed of two groups of same frequencies or different frequencies. For example: the same frequencies can cover three kinds of frequencies 40.68 MHz, 27.12 MHz, and 13.56 MHz, and every two of the same frequencies are combined to form a same-frequency radio frequency circuit. For example: the different frequencies can cover three kinds of frequencies 40.68 MHz, 27.12 MHz, and 13.56 MHz, and every two of the different frequencies are combined to form a different-frequency radio frequency circuit.

Figure 2:
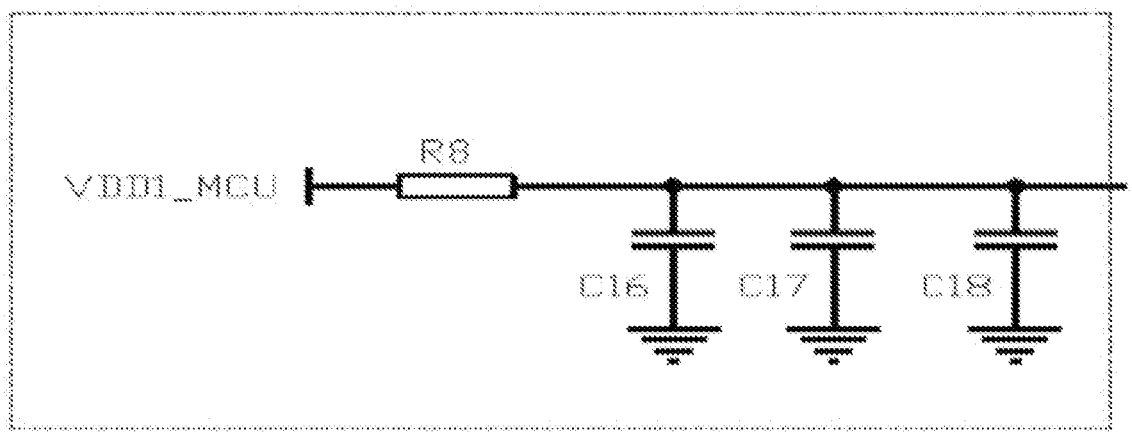
FIG. 2 shows a power filter circuit in an embodiment of the present disclosure.

Referring to FIG. 2, according to one embodiment of the present disclosure, the power filter circuit 1 includes a current limiting resistor R8, a sixteenth capacitor C16, a seventeenth capacitor C17, and an eighteenth capacitor C18; an output end of the current limiting resistor R8 is connected to a power input end VCC of the quartz crystal oscillator 2; one end of the sixteenth capacitor C16, one end of the seventeenth capacitor C17, and one end of the eighteenth capacitor C18 are electrically connected to the output end of the current limiting resistor R8; the other end of the sixteenth capacitor C16, the other end of the seventeenth capacitor C17, and the other end of the eighteenth capacitor C18 are all grounded; and the sixteenth capacitor C16, the seventeenth capacitor C17, and the eighteenth capacitor C18 filter out ripples with different frequencies in power and provide small-ripple and stable power for the quartz crystal oscillator 2.

Figure 3:
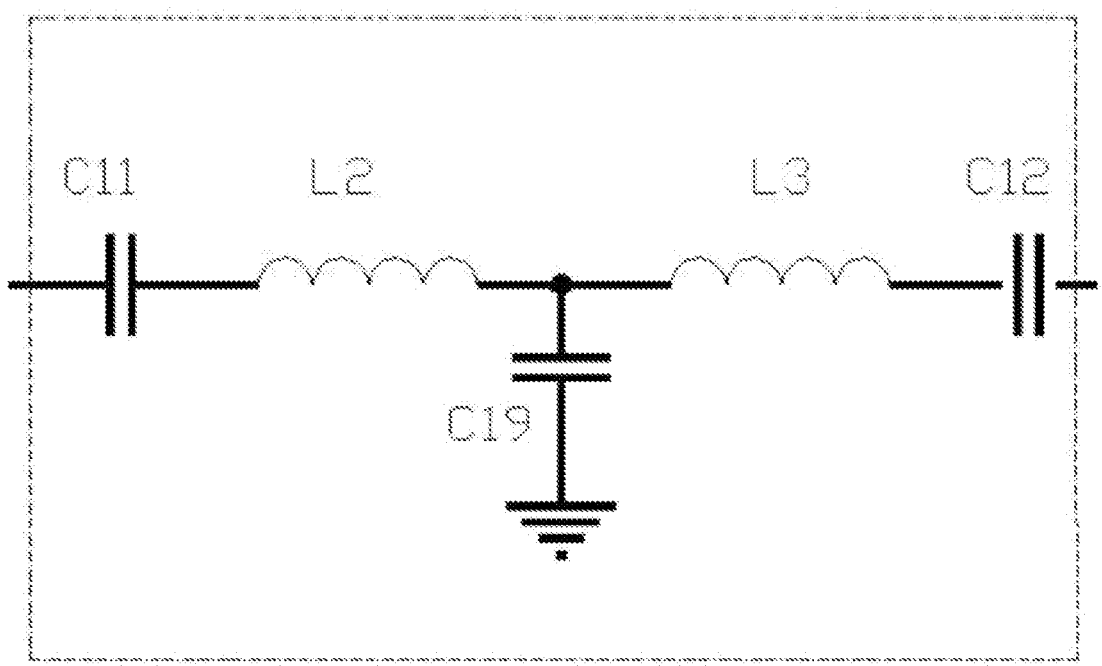
FIG. 3 shows a harmonic suppression circuit in an embodiment of the present disclosure.

Referring to FIG. 3, according to one embodiment of the present disclosure, the harmonic suppression circuit 3 includes an eleventh capacitor C11, a twelfth capacitor C12, a nineteenth capacitor C19, a second inductor L2, and a third inductor L3; the eleventh capacitor C11, the second inductor L2, the third inductor L3, and the twelfth capacitor C12 are connected in series; one end of the nineteenth capacitor C19 is electrically connected to an output end of the second inductor L2, and the other end of the nineteenth capacitor C19 is grounded; and an input end of the eleventh capacitor C11 is connected to the output end of the quartz crystal oscillator 2, and an output end of the twelfth capacitor C12 is connected to an input end of the input matching inductor 5.

Figure 4:
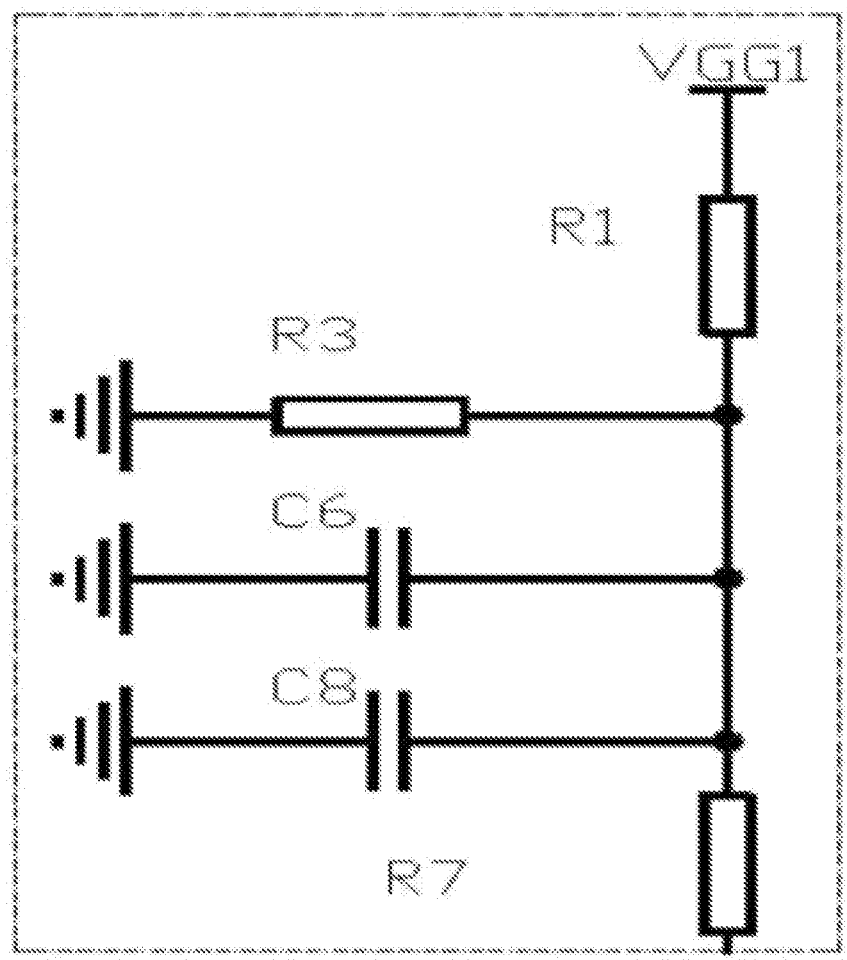
FIG. 4 shows an input end bias circuit in an embodiment of the present disclosure.

Referring to FIG. 4, according to one embodiment of the present disclosure, the input end bias circuit 4 includes a first resistor R1, a third resistor R3, a seventh resistor R7, a sixth capacitor C6, and an eighth capacitor C8; an output end of the first resistor R1 is electrically connected to the seventh resistor R7; one end of the third resistor R3, one end of the sixth capacitor C6, and one end of the eighth capacitor C8 are electrically connected to an output end of the first resistor R1; the other end of the third resistor R3, the other end of the sixth capacitor C6, and the other end of the eighth capacitor C8 are all grounded; and an output end of the seventh resistor R7 is connected to the input end of the input matching inductor 5. The seventh resistor R7 and the fifteenth resistor R15 are highly resistance components at the input ends of the first group and the second group respectively, to prevent the signal from the quartz crystal oscillator 2 from flowing into the input end bias circuit 4. The capacitors are used for power filtering. The first resistor R1 and the third resistor R3 are used for voltage sharing. The ninth resistor R9 and the eleventh resistor R11 are used for voltage sharing, to prevent extremely high VGG power to cause damage.

Figure 5:
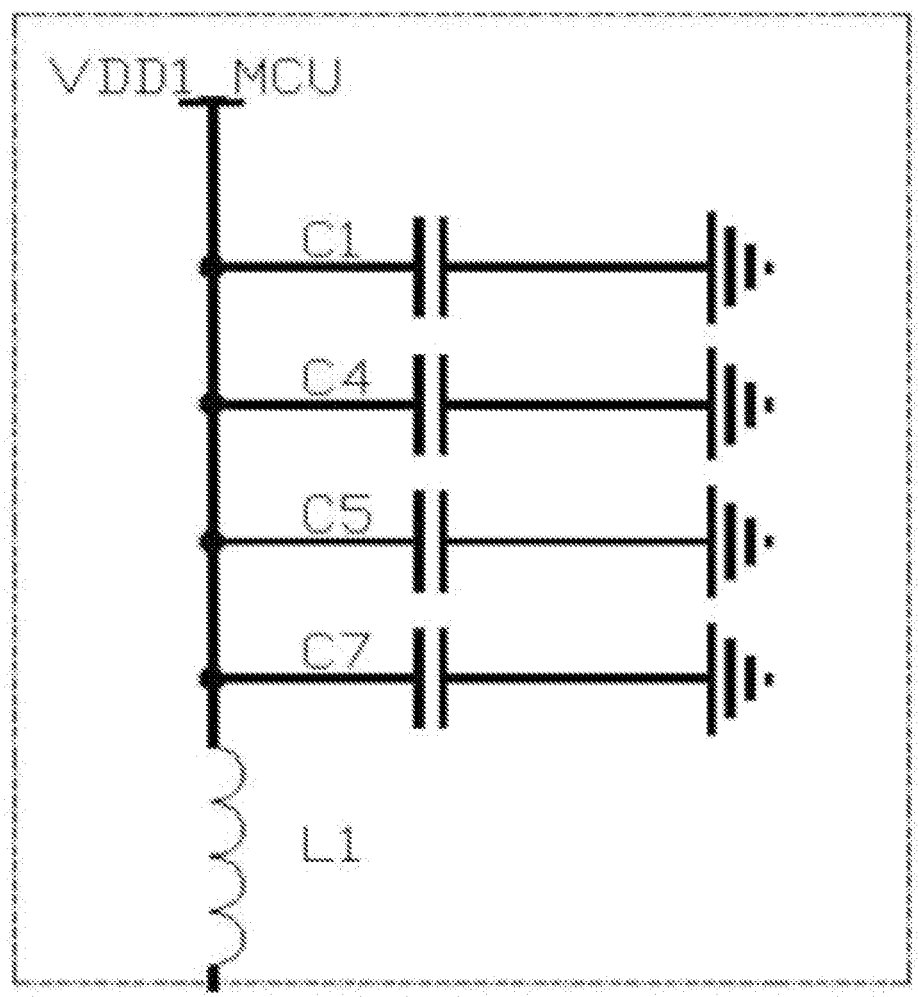
FIG. 5 shows an output end bias circuit in an embodiment of the present disclosure.

Referring to FIG. 5, according to one embodiment of the present disclosure, the output end bias circuit 7 includes a first capacitor C1, a fourth capacitor C4, a fifth capacitor C5, a seventh capacitor C7, and a first inductor L1; one end of the first capacitor C1, one end of the fourth capacitor C4, one end of the fifth capacitor C5, and one end of the seventh capacitor C7 are connected to the first inductor L1, and the other end of the first capacitor C1, the other end of the fourth capacitor C4, the other end of the fifth capacitor C5, and the other end of the seventh capacitor C7 are grounded; and an output end of the first inductor L1 is connected to the output matching circuit 8.

Figure 6:
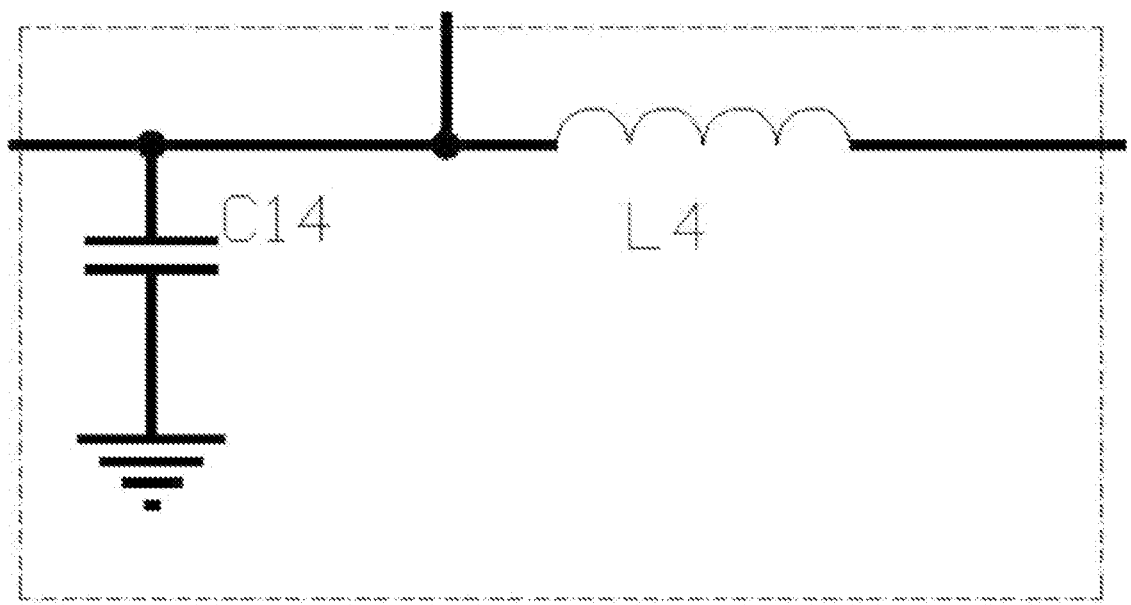
FIG. 6 shows an output matching circuit in an embodiment of the present disclosure.

Referring to FIG. 6, according to one embodiment of the present disclosure, the output matching circuit 8 includes a fourth inductor L4 and a fourteenth capacitor C14; one end of the fourteenth capacitor C14 is connected to the output end of the amplifier 6; and the other end of the fourteenth capacitor C14 is connected to the fourth inductor L4.

Figure 7:
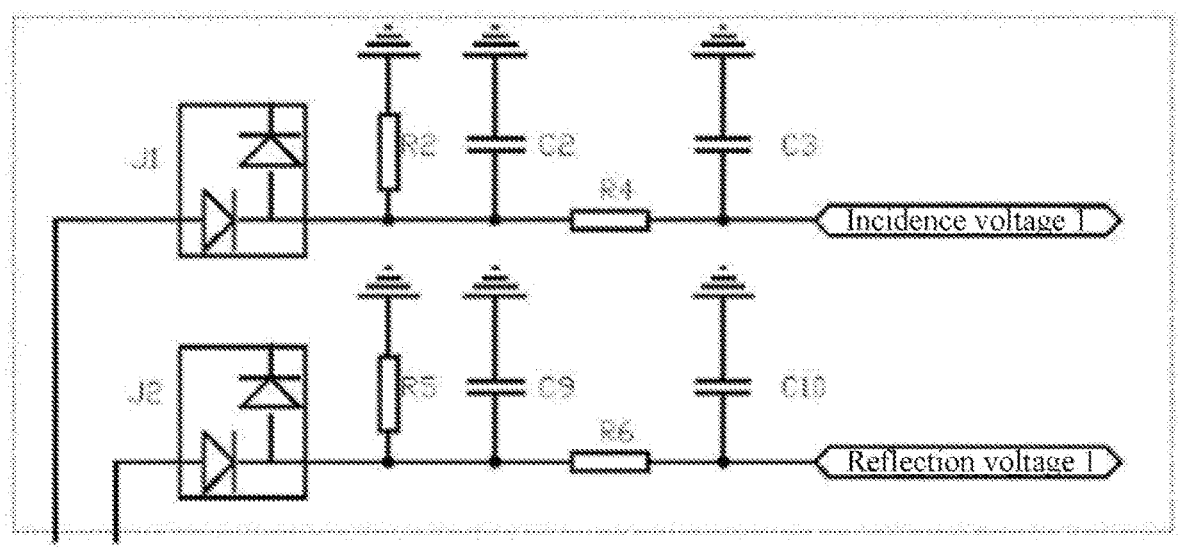
FIG. 7 shows a detection circuit in an embodiment of the present disclosure.

Referring to FIG. 7, according to one embodiment of the present disclosure, the detection circuit 9 includes a first detection diode J1, a second resistor R2, a second capacitor C2, a fourth resistor R4, a third capacitor C3, a second detection diode J2, a fifth resistor R5, a ninth capacitor C9, a sixth resistor R6, and a tenth capacitor C10; the first detection diode J1 and the fourth resistor R4 are connected in series in the circuit; one end of the second resistor R2 and one end of the second capacitor C2 are connected to an intersection point of the first detection diode J1 and the fourth resistor R4; the other end of the second resistor R2 and the other end of the second capacitor C2 are grounded; and one end of the third capacitor C3 is connected to the fourth resistor R4, and the other end of the third capacitor C3 is grounded. The second detector diode J2 and the resistor R6 are connected in series in the circuit; one end of the resistor R5 and one end of the capacitor C9 are connected to an intersection point of the detection diode J2 and the sixth resistor R6; the other end of the fifth resistor R5 and the other end of the ninth capacitor C9 are grounded; and one end of the tenth capacitor C10 is connected to the sixth resistor R6, and the other end of the tenth capacitor C10 is grounded.

Figure 8:
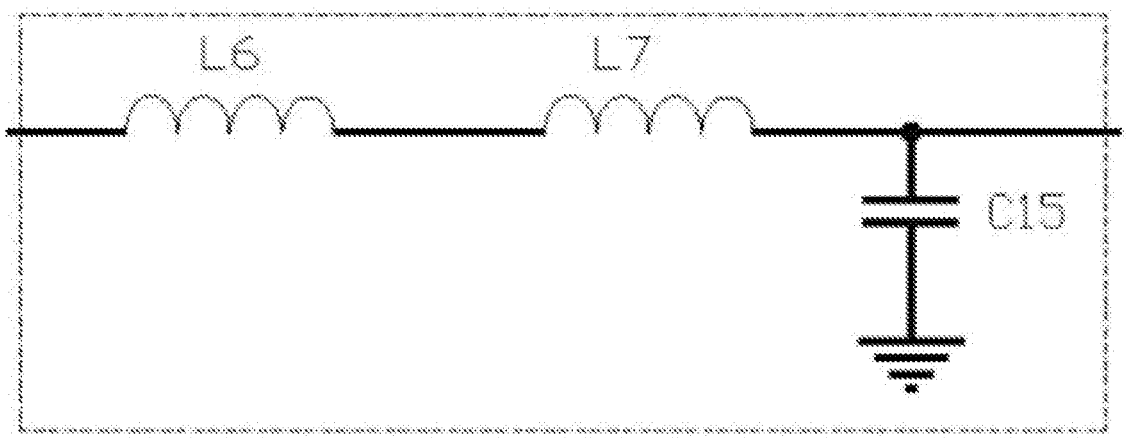
FIG. 8 shows an output matching circuit in an embodiment of the present disclosure.

Referring to FIG. 8, according to one embodiment of the present disclosure, the antenna matching circuit 10 includes a sixth inductor L6, a seventh inductor L7, and a fifteenth capacitor C15; the sixth inductor L6 is connected in series with the seventh inductor L7; and one end of the fifteenth capacitor C15 is connected to the seventh inductor L7, and the other end of the fifteenth capacitor C15 is grounded. The antenna matching circuit 10 is not limited in this embodiment as the matching circuit varies according to different forms of antennas 11.

According to one embodiment of the present disclosure, the antenna 11 includes four copper rings. Every two copper rings form a group of antenna emitter, and the corresponding antenna emitters are connected to the corresponding radio frequency circuits. That is, the first group of antenna emitter is connected to the first group of radio frequency circuit 100, and the second group of antenna emitter is connected to the second group of radio frequency circuit 200. Further, the antenna 11 is an emitter that can emit infrared rays. The antenna emitter is composed of a coating, a heating body, or a heat source matrix. The function of the coating is to ensure that rays with a desired band width and certain radiant power can be emitted at a certain temperature. For example, a common gas far-infrared emitter uses a high temperature generated during gas combustion to heat a ceramic or metal matrix and a far-infrared radiant coating to achieve far-infrared radiation. Based on the above, the control circuits 300 of the corresponding radio frequency circuits can correspondingly control activation of the antenna emitters to complete subsequent work.

According to the above, a controller is used to perform time-sharing work on two groups of signals. The signals are emitted by the antennas 11 to act on two parts, and the two groups of signals are continuously switched to work, so that the problem of local heat accumulation is not caused, an action area is enlarged, and a load on key components is reduced, thereby improving the use effect, the application range, and the reliability.

It should be emphasized that in practical applications of the radio frequency circuit of this solution, the controller enables two groups of signal to work in a time-sharing manner. The antennas 11 emit the signals to two working parts. Since the two groups of signals are constantly switched, the problem of local heat accumulation will not be caused; the action area is enlarged; and a load on key components is also reduced, thereby improving the reliability of the radio frequency circuit. The problem of the depth of action has been solved. Different frequencies correspond to different wavelengths, such as a wavelength of about 7.4 meters at 40.68 MHz, a wavelength of about 11 meters at 27.12 MHz, and a wavelength of about 22 meters at 13.56 MHz.

The foregoing descriptions are merely specific implementations of the present disclosure, but the protection scope of the present disclosure is not limited. Changes or replacements easily thought by any person skilled in the art within the technical scope disclosed in the present disclosure shall fall within the protection scope of the present disclosure. Therefore, the protection scope of the present application should be subject to the appended claims.

What is claimed is:

1. A two-group portable same-frequency or different-frequency control radio frequency circuit, comprising two groups of radio frequency circuits and a control circuit (300) for controlling the two groups of radio frequency circuits, wherein each group of radio frequency circuit comprises a power filter circuit (1), a quartz crystal oscillator (2), a harmonic suppression circuit (3), an input end bias circuit (4), an input matching inductor (5), an amplifier (6), an output end bias circuit (7), an output matching circuit (8), a detection circuit (9), an antenna matching circuit (10), and an antenna (11);

the power filter circuit (1) is electrically connected to the quartz crystal oscillator (2); the power filter circuit (1) includes a current limiting resistor R8, a sixteenth capacitor C16, a seventeenth capacitor C17, and an eighteenth capacitor C18; an output end of the current limiting resistor R8 is connected to a power input end VCC of the quartz crystal oscillator (2); one end of the sixteenth capacitor C16, one end of the seventeenth capacitor C17, and one end of the eighteenth capacitor C18 are electrically connected to the output end of the current limiting resistor R8; the other end of the sixteenth capacitor C16, the other end of the seventeenth capacitor C17, and the other end of the eighteenth capacitor C18 are all grounded; the sixteenth capacitor C16, the seventeenth capacitor C17, and the eighteenth capacitor C18 filter out ripples with different frequencies in power and provide small-ripple and stable power for the quartz crystal oscillator (2); the quartz crystal oscillator (2) is electrically connected to the harmonic suppression circuit (3), and the quartz crystal oscillator (2) is used for generating a stable frequency for the circuit; the harmonic suppression circuit (3) is electrically connected to the input matching inductor (5), and the harmonic suppression circuit (3) is used for filtering out unnecessary frequency components for the circuit; the harmonic suppression circuit (3) comprises an eleventh capacitor C11, a twelfth capacitor C12, a nineteenth capacitor C19, a second inductor L2, and a third inductor L3; the eleventh capacitor C11, the second inductor L2, the third inductor L3, and the twelfth capacitor C12 are connected in series; one end of the nineteenth capacitor C19 is electrically connected to an output end of the second inductor L2, and the other end of the nineteenth capacitor C19 is grounded; an input end of the eleventh capacitor C11 is connected to the output end of the quartz crystal oscillator (2), and an output end of the twelfth capacitor C12 is connected to an input end of the input matching inductor (5); the input end bias circuit (4) is electrically connected to the harmonic suppression circuit (3), and the input end bias circuit (4) is used for providing a bias voltage for the amplifier (6) and playing a role in starting and regulating a power output; the input matching inductor (5) is electrically connected to the amplifier (6) to complete input impedance matching of the amplifier (6); the amplifier (6) is electrically connected to the output matching circuit (8); the amplifier (6) is used for amplifying a signal generated by the quartz crystal oscillator (2) to meet needs of the circuit; the output end bias circuit (7) is connected in parallel between the amplifier (6) and the output matching circuit (8) and is used for providing a suitable power supplying voltage for the amplifier (6), ensuring stable and reliable operations of the circuit; the output matching circuit (8) is electrically connected to the detection circuit (9), and the output matching circuit (8) is used for completing output impedance matching of the amplifier (6); the detection circuit (9) is electrically connected to the antenna matching circuit (10); the detection circuit (9) is used for performing incidence and reflection detection on the signal, and the signal is collected in the form of a direct current voltage output; the antenna matching circuit (10) is connected in series with the antenna (11) to complete impedance matching; the antenna (11) outputs the power generated by the amplifier (6); the output end bias circuit (7) comprises a first capacitor C1, a fourth capacitor C4, a fifth capacitor C5, a seventh capacitor C7, and a first inductor L1; one end of the first capacitor C1, one end of the fourth capacitor C4, one end of the fifth capacitor C5, and one end of the seventh capacitor C7 are connected to the first inductor L1, and the other end of the first capacitor C1, the other end of the fourth capacitor C4, the other end of the fifth capacitor C5, and the other end of the seventh capacitor C7 are grounded; an output end of the first inductor L1 is connected to the output matching circuit (8); the detection circuit (9) comprises a first detection diode J1, a second resistor R2, a second capacitor C2, a fourth resistor R4, a third capacitor C3, a second detection diode J2, a fifth resistor R5, a ninth capacitor C9, a sixth resistor R6, and a tenth capacitor C10; the first detection diode J1 and the fourth resistor R4 are connected in series in the circuit; one end of the second resistor R2 and one end of the second capacitor C2 are connected to an intersection point of the first detection diode J1 and the fourth resistor R4; the other end of the second resistor R2 and the other end of the second capacitor C2 are grounded; one end of the third capacitor C3 is connected to the fourth resistor R4, and the other end of the third capacitor C3 is grounded; the second detector diode J2 and the resistor R6 are connected in series in the circuit; one end of the resistor R5 and one end of the capacitor C9 are connected to an intersection point of the detection diode J2 and the sixth resistor R6; the other end of the fifth resistor R5 and the other end of the ninth capacitor C9 are grounded; one end of the tenth capacitor C10 is connected to the sixth resistor R6, and the other end of the tenth capacitor C10 is grounded; the antenna matching circuit (10) comprises a sixth inductor L6, a seventh inductor L7, and a fifteenth capacitor C15; the sixth inductor L6 is connected in series with the seventh inductor L7; one end of the fifteenth capacitor C15 is connected to the seventh inductor L7, and the other end of the fifteenth capacitor C15 is grounded; the antenna (11) comprises four copper rings; every two copper rings form a group of antenna emitters, and the corresponding antenna emitters are connected to the corresponding radio frequency circuits;

wherein the two groups of radio frequency circuits are switched by the control circuit (300) and then start to work in turn in a time-sharing manner, and frequencies of the two groups of radio frequency circuits are set as different frequencies for outputting, that is, working frequencies of the two groups of radio frequency circuits are set as different frequencies for outputting, including 40.68 MHz, 27.12 MHz, and 13.56 MHz.

2. The two-group portable same-frequency or different-frequency control radio frequency circuit according to claim 1, wherein the input end bias circuit (4) comprises a first resistor R1, a third resistor R3, a seventh resistor R7, a sixth capacitor C6, and an eighth capacitor C8; an output end of the first resistor R1 is electrically connected to the seventh resistor R7; one end of the third resistor R3, one end of the sixth capacitor C6, and one end of the eighth capacitor C8 are electrically connected to an output end of the first resistor R1; the other end of the third resistor R3, the other end of the sixth capacitor C6, and the other end of the eighth capacitor C8 are all grounded; and an output end of the seventh resistor R7 is connected to the input end of the input matching inductor (5).

3. The two-group portable same-frequency or different-frequency control radio frequency circuit according to claim 1, wherein the output matching circuit (8) comprises a fourth inductor L4 and a fourteenth capacitor C14; one end of the fourteenth capacitor C14 is connected to the output end of the amplifier (6); and the other end of the fourteenth capacitor C14 is connected to the fourth inductor L4.

\* \* \* \* \*